(12) United States Patent
Santana et al.

(10) Patent No.: US 11,782,464 B2
(45) Date of Patent: Oct. 10, 2023

(54) ADAPTIVE CLOSED LOOP CONTROL METHOD FOR A COOKING APPLIANCE

(71) Applicant: Haier US Appliance Solutions, Inc., Wilmington, DE (US)

(72) Inventors: Omar Santana, Louisville, KY (US); James Lee Armstrong, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 121 days.

(21) Appl. No.: 17/117,353

(22) Filed: Dec. 10, 2020

(65) Prior Publication Data

US 2022/0187859 A1 Jun. 16, 2022

(51) Int. Cl.
| | |
|---|---|
| G05D 23/19 | (2006.01) |
| F24C 3/12 | (2006.01) |
| A47J 36/32 | (2006.01) |
| F24C 7/08 | (2006.01) |

(52) U.S. Cl.
CPC .......... G05D 23/1919 (2013.01); A47J 36/32 (2013.01); F24C 3/126 (2013.01); F24C 7/082 (2013.01); A47J 2202/00 (2013.01); G05D 23/1931 (2013.01)

(58) Field of Classification Search
CPC ........ A47J 36/32; A47J 2202/00; A47J 27/10; A23L 5/13; F24C 3/126; F24C 7/082; F24C 7/083; G05D 23/1919; G05D 23/1931
See application file for complete search history.

(56) References Cited

U.S. PATENT DOCUMENTS

| | | | |
|---|---|---|---|
| 10,018,514 B2 * | 7/2018 | Jewell | G01K 1/143 |
| 10,292,521 B2 | 5/2019 | Johncock et al. | |
| 2013/0052310 A1 * | 2/2013 | Stanford | A23L 5/11 99/333 |
| 2017/0238749 A1 * | 8/2017 | Vengroff | A47J 36/321 |
| 2017/0367151 A1 * | 12/2017 | Rafii | H05B 6/1218 |
| 2018/0007739 A1 * | 1/2018 | Knappenberger | G01R 19/165 |
| 2018/0070756 A1 * | 3/2018 | Vengroff | A47J 36/321 |

FOREIGN PATENT DOCUMENTS

| | | | | | |
|---|---|---|---|---|---|
| CN | 109674335 A | * | 4/2019 | ............ | A47J 27/004 |
| JP | 4936814 B2 | | 5/2012 | | |

* cited by examiner

Primary Examiner — Drew E Becker
Assistant Examiner — Ariel M Miller
(74) Attorney, Agent, or Firm — Dority & Manning, P.A.

(57) ABSTRACT

A method of operating a cooking appliance includes obtaining a set fluid temperature for a fluid within a cooking utensil, monitoring an actual fluid temperature via a first temperature sensor of a probe, determining a predicted air temperature above the fluid, monitoring an actual air temperature above the fluid via a second temperature sensor of the probe, comparing the actual air temperature to the predicted air temperature, and implementing a responsive action based on the comparison between the actual air temperature and the predicted air temperature.

9 Claims, 6 Drawing Sheets

ADAPTIVE CLOSED LOOP CONTROL METHOD FOR A COOKING APPLIANCE

FIELD OF THE INVENTION

The present subject matter relates generally to cooking appliances, and more particularly to control methods for cooking appliances incorporating submerged temperature probes.

BACKGROUND OF THE INVENTION

Cooktops generally have one or more heating elements configured for heating a cooking utensil. The cooking utensil, e.g., a pot or a pan, may be placed on the cooktop and food products (including, e.g., food solids, liquid, or water) may be placed inside the cooking utensil for cooking. A controller may selectively energize the heating element(s) to provide thermal energy to the cooking utensil and the food products placed therein. Alternatively, certain cooktops, often referred to as induction cooktops, provide energy in the form of an alternating magnetic field which causes the cooking utensil to generate heat. In both types of cooktops, a controller selectively energizes either the heating element(s) or a magnetic coil to heat the food products until they are properly cooked.

Many food products require careful monitoring and control of the cook time and temperature in order to provide optimal cooking results. In order to obtain precise feedback and control of the temperature of the food products as they are heated/cooked, a temperature probe may be placed in thermal communication with the food products. Temperature information is communicated to a control housing, which typically includes control electronics and a display for displaying the temperature of the food products. Notably, certain recipes may require the use of a lid or cover to facilitate a cooking process. Failure to include the lid may affect the outcome of the recipe, e.g., by generating undesirable temperature gradients within the cooking utensil or in the food being cooked.

Accordingly, a cooking appliance and a method of operating a cooking appliance that obviates one or more of the above-mentioned issues would be desirable. More particularly, a cooking appliance and a method of operating a cooking appliance that determined the presence of a cover on a cooking utensil would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a cooking appliance is provided. The cooking appliance may include a probe having a first temperature sensor for sensing a fluid temperature and a second temperature sensor for sensing an air temperature. The method may include obtaining a set fluid temperature for a fluid within a cooking utensil, monitoring an actual fluid temperature via the first temperature sensor of the probe, determining a predicted air temperature above the fluid, monitoring an actual air temperature above the fluid via the second temperature sensor of the probe, comparing the actual air temperature to the predicted air temperature, and implementing a responsive action based on the comparison between the actual air temperature and the predicted air temperature.

In another exemplary embodiment of the present disclosure, a cooking appliance for heating food contents within a cooking utensil is provided. The cooking appliance may include a heating element, a probe in operative communication with the heating element, the probe having a first temperature sensor positioned within a fluid contained within the utensil and a second temperature sensor spaced apart from the first temperature sensor above the fluid, a probe holder configured to attach the probe to a cooking utensil, and a controller in communication with the heating element and the probe, the controller being configured to perform an operation. The operation may include obtaining a set fluid temperature for the fluid within the cooking utensil, determining the presence of a cover over the cooking utensil, and implementing a responsive action based on the presence of the cover.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
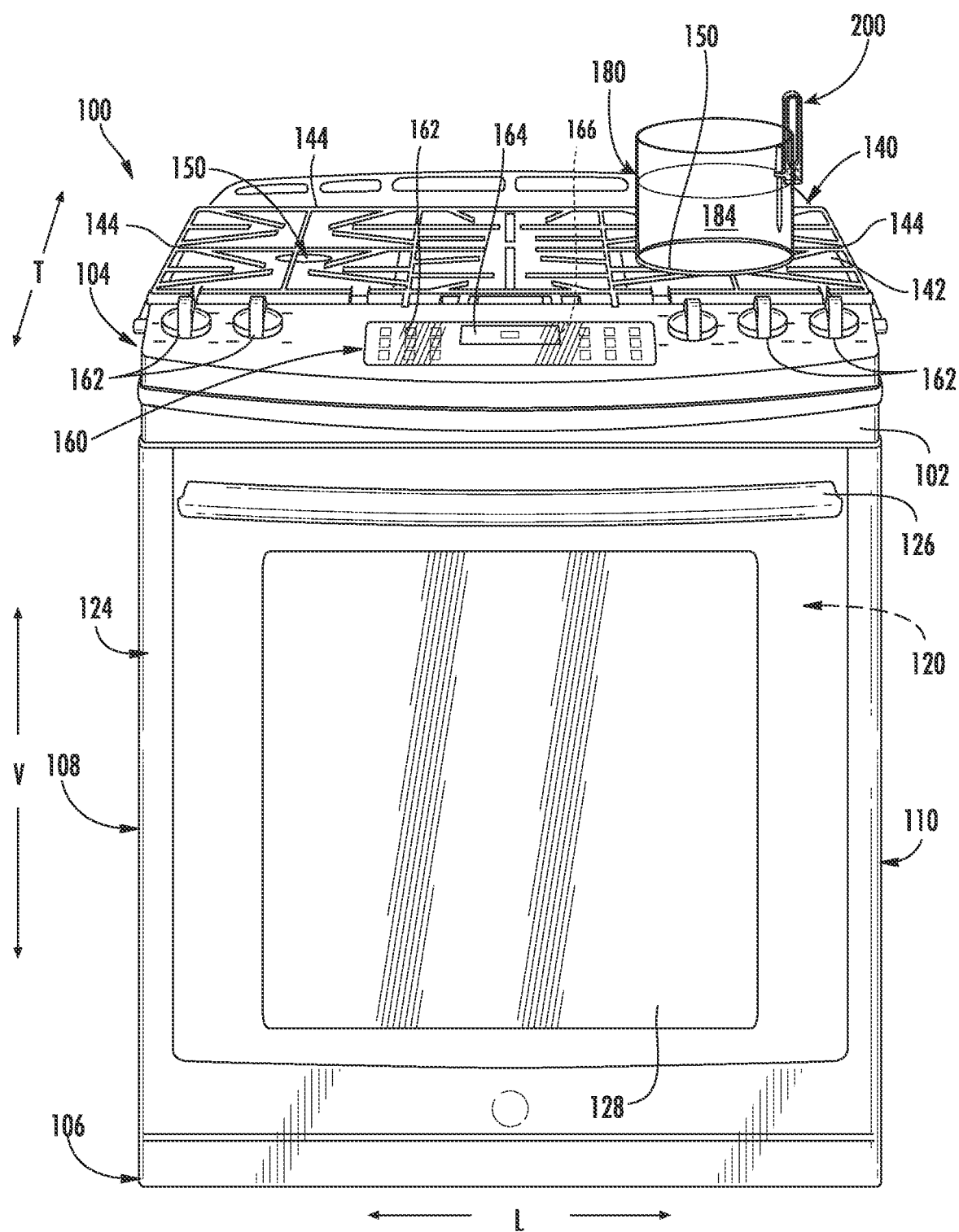
FIG. 1 provides a front perspective view of a cooking appliance including a cooktop, a cooking utensil, and a temperature probe attached to the cooking utensil according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components.

FIG. 1 provides a front, perspective view of a cooking appliance 100 as may be employed with the present subject matter. Cooking appliance 100 generally defines a vertical direction V, a lateral direction L, and a transverse direction T, each of which is mutually perpendicular, such that an orthogonal coordinate system is generally defined. As illustrated, cooking appliance 100 includes an insulated cabinet 102. Cabinet 102 of cooking appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that cooking appliance 100 is provided by way of example only, and aspects of the present subject matter may be used in any suitable cooking appliance, such as a double oven range appliance. Thus, the example embodiment shown in FIG. 1 is not intended to limit the present subject matter to any particular cooking chamber configuration or arrangement. Indeed, aspects of the present subject matter may be applied to door assemblies for any suitable appliance.

Cooking appliance 100 includes a door 124 rotatably attached to cabinet 102 in order to permit selective access to cooking chamber 120. Handle 126 is mounted to door 124 to assist a user with opening and closing door 124 in order to access cooking chamber 120. As an example, a user can pull on handle 126 mounted to door 124 to open or close door 124 and access cooking chamber 120. One or more transparent viewing windows 128 (FIG. 1) may be defined within door 124 to provide for viewing the contents of cooking chamber 120 when door 124 is closed and also assist with insulating cooking chamber 120.

Figure 2:
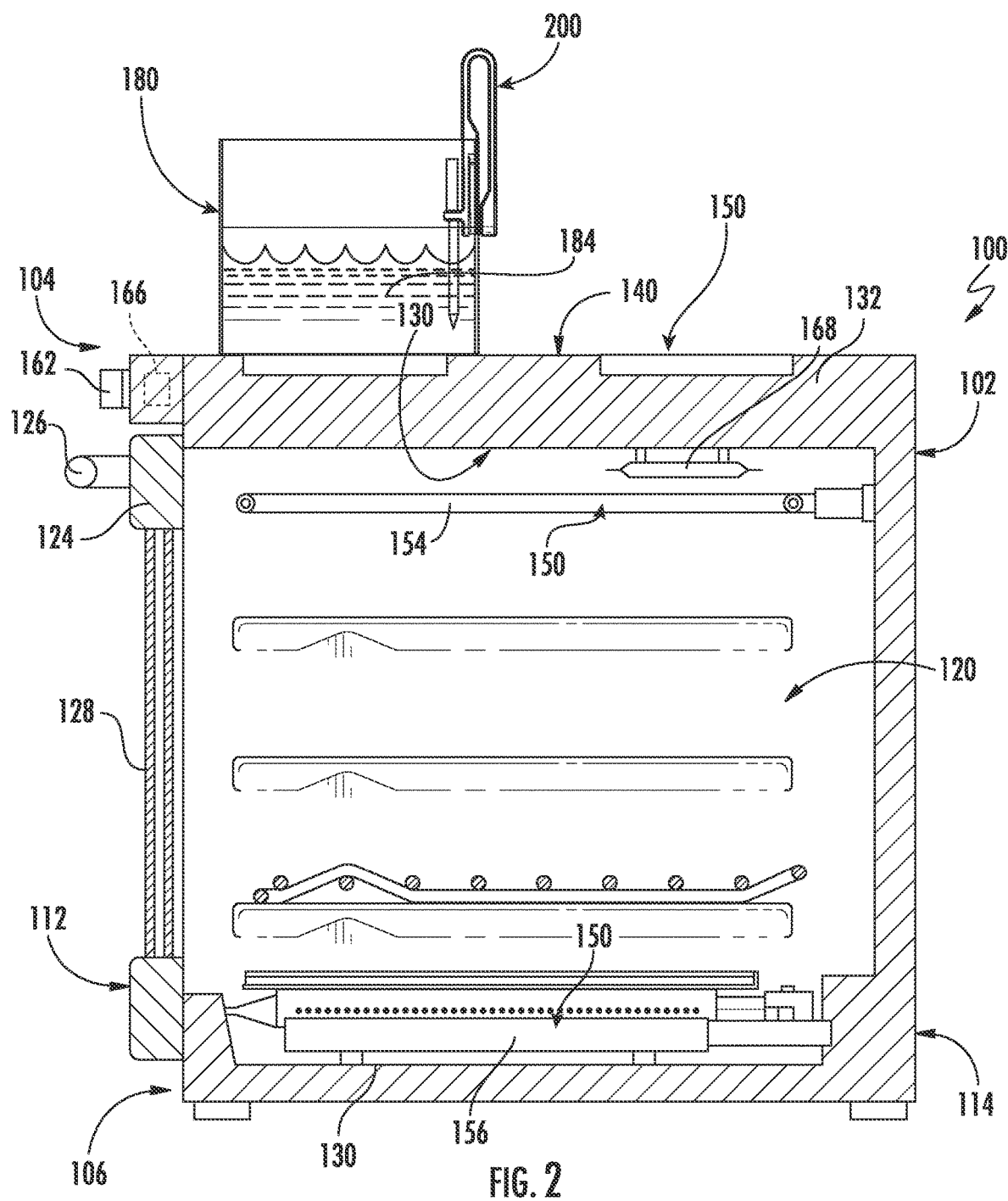
FIG. 2 provides a cross sectional side view of the exemplary cooking appliance and temperature probe of FIG. 1.

In general, cooking chamber 120 is defined by a plurality of chamber walls 130 (FIG. 2). Specifically, cooking chamber 120 may be defined by a top wall, a rear wall, a bottom wall, and two sidewalls 130. These chamber walls 130 may be joined together to define an opening through which a user may selectively access cooking chamber 120 by opening door 124. In order to insulate cooking chamber 120, cooking appliance 100 includes an insulating gap defined between the chamber walls 130 and cabinet 102. According to an exemplary embodiment, the insulation gap is filled with an insulating material 132, such as insulating foam or fiberglass, for insulating cooking chamber 120.

Cooking appliance 100 also includes a cooktop 140. Cooktop 140 is positioned at or adjacent top 104 of cabinet 102 such that it is positioned above cooking chamber 120. Specifically, cooktop 140 includes a top panel 142 positioned proximate top 104 of cabinet 102. By way of example, top panel 142 may be constructed of glass, ceramics, enameled steel, and combinations thereof. One or more grates 144 are supported on a top surface of top panel 142 for supporting cooking utensils, such as pots or pans, during a cooking process.

Cooking appliance 100 may further include one or more heating elements (identified generally by reference numeral 150) for selectively heating cooking utensils positioned on grates 144 or food items positioned within cooking chamber 120. For example, referring to FIG. 1, heating elements 150 may be gas burners 150. Specifically, a plurality of gas burners 150 are mounted within or on top of top panel 142 such that grates 144 support cooking utensils over gas burners 150 while gas burners 150 provide thermal energy to cooking utensils positioned thereon, e.g., to heat food and/or cooking liquids (e.g., oil, water, etc.). Gas burners 150 can be configured in various sizes so as to provide e.g., for the receipt of cooking utensils (i.e., pots, pans, etc.) of various sizes and configurations and to provide different heat inputs for such cooking utensils. According to alternative embodiments, cooking appliance 100 may have other cooktop configurations or burner elements.

In addition, heating elements 150 may be positioned within or may otherwise be in thermal communication with cooking chamber 120 for regulating the temperature within cooking chamber 120. Specifically, an upper gas heating element 154 (also referred to as a broil heating element or gas burner) may be positioned in cabinet 102, e.g., at a top portion of cooking chamber 120, and a lower gas heating element 156 (also referred to as a bake heating element or gas burner) may be positioned at a bottom portion of cooking chamber 120. Upper gas heating element 154 and lower gas heating element 156 may be used independently or simultaneously to heat cooking chamber 120, perform a baking or broil operation, perform a cleaning cycle, etc. The size and heat output of gas heating elements 154, 156 can be selected based on the, e.g., the size of cooking appliance 100 or the desired heat output. Cooking appliance 100 may include any other suitable number, type, and configuration of heating elements 150 within cabinet 102 and/or on cooktop 140. For example, cooking appliance 100 may further include electric heating elements, induction heating elements, or any other suitable heat generating device.

A user interface panel 160 is located within convenient reach of a user of the cooking appliance 100. For this example embodiment, user interface panel 160 includes knobs 162 that are each associated with one of heating elements 150. In this manner, knobs 162 allow the user to activate each heating element 150 and determine the amount of heat input provided by each heating element 150 to cooking food items within cooking chamber 120 or on cooktop 140. Although shown with knobs 162, it should be understood that knobs 162 and the configuration of cooking appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, cooking appliance 100 may include a controller 166 in operative communication with user interface panel 160. User interface panel 160 of cooking appliance 100 may be in communication with controller 166 via, for example, one or more signal lines or shared communication busses, and signals generated in controller 166 operate cooking appliance 100 in response to user input via user input devices 162. Input/Output ("I/O") signals may be routed between controller 166 and various operational components of cooking appliance 100 such that operation of cooking appliance 100 can be regulated by controller 166. In addition, controller 166 may also be in communication with one or more sensors, such as temperature sensor 168 (FIG. 2), which may be used to measure temperature inside cooking chamber 120 and provide such measurements to the controller 166. Although temperature sensor 168 is illustrated at a top and rear of cooking chamber 120, it should be appreciated that other sensor types, positions, and configurations may be used according to alternative embodiments.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of cooking appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of a single oven appliance, it should be appreciated that cooking appliance 100 is provided by way of example only. Other oven or range appliances having different configurations, different appearances, and/or different features may also be utilized with the present subject matter, e.g., double ovens, standalone cooktops, etc.

Figure 3:
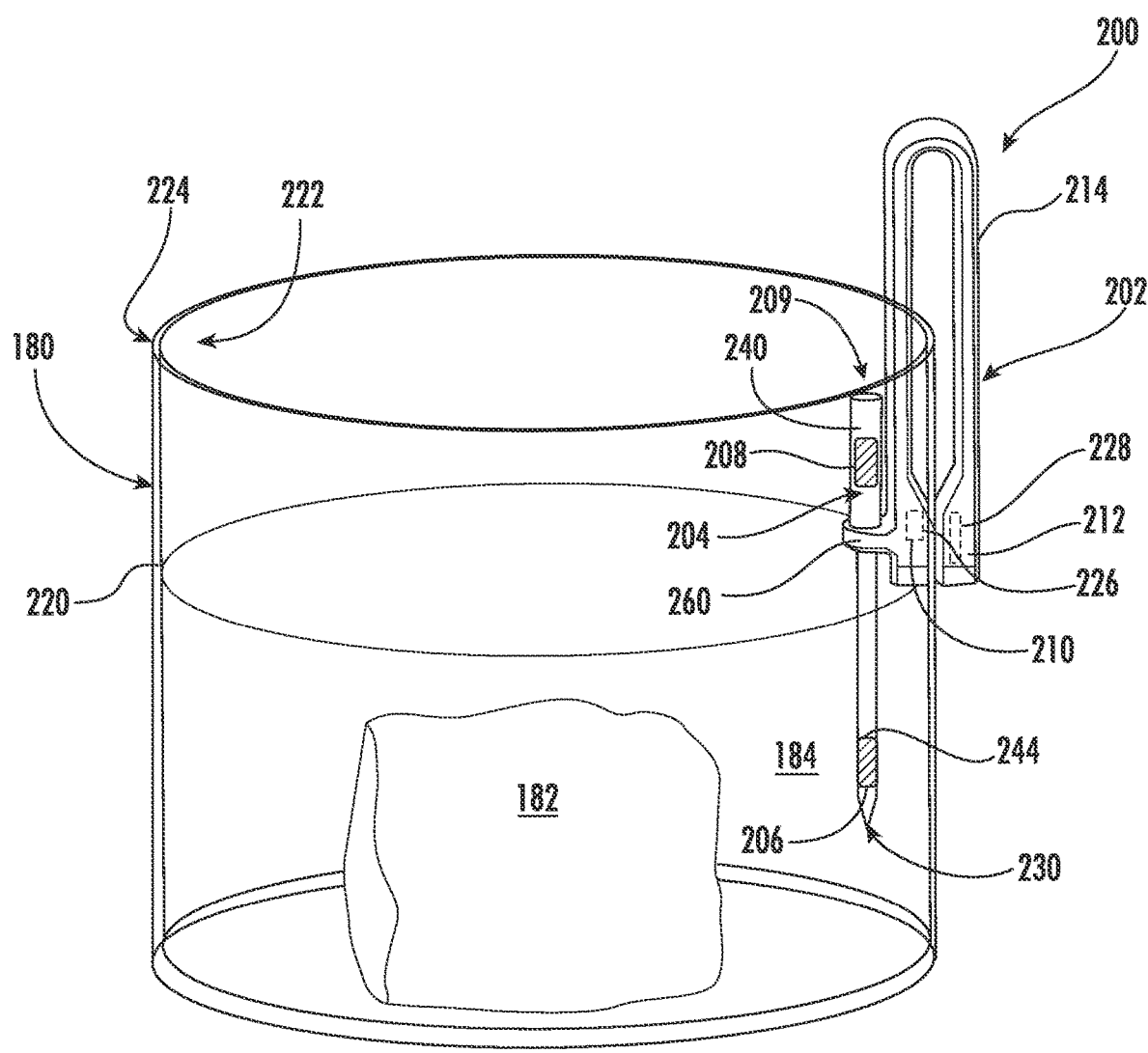
FIG. 3 provides a perspective view of a cooking utensil and a temperature probe according to an exemplary embodiment of the present subject matter.

As illustrated in FIGS. 1 through 3, cooking appliance 100 may be designed for receiving and heating a cooking utensil 180. In general, cooking utensil 180 is a vessel or container configured for receiving food products 182, cooking fluid or liquid 184, and/or other contents to facilitate a cooking process. Although cooking utensil 180 and the temperature probe 200 (described below) are described and illustrated herein as being positioned on a gas burner 150 of cooking appliance 100, it should be appreciated that aspects of the present subject matter may be used in any other suitable cooking appliance, environment, or position. For example, cooking utensil 180 may be positioned on another gas burner 150, within cooking chamber 120, or at any other suitable location within any other suitable appliance to facilitate a cooking process. Thus, the present subject matter may be used with other cooking appliances having different cooktop and heating element types and configurations (e.g., radiant, gas, induction, etc.), and may also be used with different types of cooking utensils.

As used herein, "food products" (referred to generally by reference numeral 182) may refer to any solid or liquid intended to be cooked and eaten, in contrast to "cooking liquid" (referred to generally by reference numeral 184), which may be used to heat the food products, e.g., via boiling or to facilitate a sous vide cooking process. As explained in more detail below, the temperature probe disclosed herein is capable of measuring either the food product directly or the cooking liquid, e.g., to facilitate a sous vide process.

Figure 4:
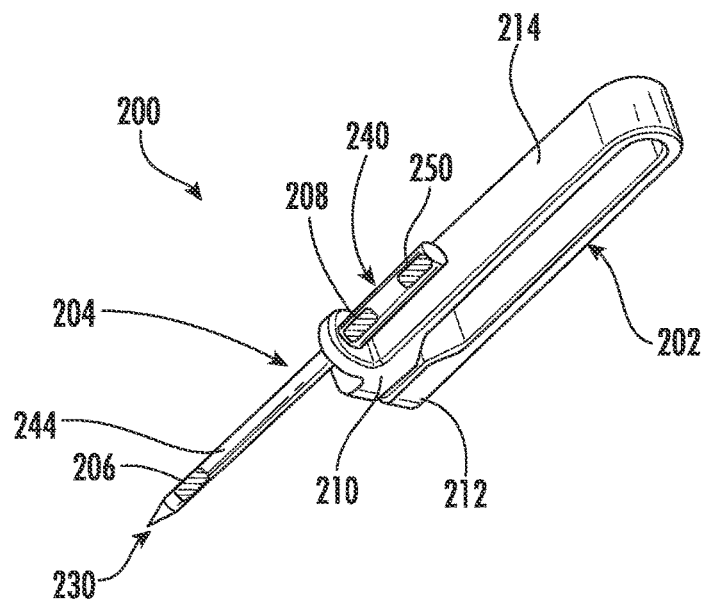
FIG. 4 provides a perspective view of the exemplary temperature probe of FIG. 3.

Referring now to FIGS. 3 and 4, temperature probe 200 will be described according to embodiments of the present subject matter. It should be appreciated that aspects or features of different embodiments may be used alternatively as part of another embodiment or features described herein may be merged or modified to create a new embodiment in accordance with aspects of the present subject matter. The embodiments described herein are only exemplary, are intended only to facilitate explanation of aspects of the present subject matter and are not intended to limit the scope of the disclosure in any manner.

As illustrated, temperature probe 200 generally includes a flexible arm 202 that is configured for mounting a temperature sensor 204 onto a cooking utensil (e.g., such as cooking utensil 180) and positioning temperature sensor 204 in a manner to facilitate temperature measurement of food products 182, liquids 184, ambient air above fluid 184, or any combination thereof. Specifically, flexible arm 202 includes a first end 210 and a second end 212 that are joined by a flexible connector 214 that extends between first end 210 and second end 212. To mount temperature probe 200 on cooking utensil 180, flexible arm 202 may be placed over a side 220 of cooking utensil 180. First end 210 and second end 212 may be removably attached to an interior surface 222 and an exterior surface 224, respectively, of side 220 of cooking utensil 180.

Notably, due to its position during operation, flexible arm 202 must be able to withstand very high temperatures. According to the illustrated embodiment, flexible arm 202 is made of silicone rubber. Silicone rubber is capable of withstanding very high temperatures while remaining flexible. In addition, silicone rubber is also non-toxic, is not prone to cracking or deteriorating, and acts as an insulator to limit the conduction of heat to the various portions of temperature probe 200. However, one skilled in the art will appreciate that flexible arm 202 may be made from any suitably flexible and durable material that can withstand high temperatures.

According to an exemplary embodiment, flexible arm 202 may be attached to cooking utensil 180 using magnets. For example, as shown in the figures, flexible arm 202 may have a first magnet 226 positioned within or mounted to first end 210 and a second magnet 228 positioned within or mounted to second end 212. In other words, first magnet 226 may be proximate temperature sensor 204, and second magnet 228 may be distal from temperature sensor 204 along the flexible arm 202. Magnets 226, 228 may be attached to flexible arm 202 after it is molded, for example, by using an adhesive or mechanical fastener. Alternatively, magnets 226, 228 may be incorporated into a mold prior to molding flexible arm 202, such that they may be integrally molded within flexible arm 202. In addition, magnets 226, 228 may be positioned and oriented within flexible arm 202 such that the magnetic poles attract each other when flexible arm 202 is placed over side 220 of cooking utensil 180.

Flexible arm 202 may be attached to cooking utensil 180 by placing first end 210 and second end 212 at the desired position on cooking utensil 180. For example, as shown in FIG. 3, first end 210 is placed on interior surface 222 such that it is secured by magnetic force to cooking utensil 180, which may be ferromagnetic. In this manner, first end 210 of flexible arm 202 may be magnetically attachable to cooking utensil 180 such that temperature sensor 204 may be selectively positioned and fixed within fluid 184—e.g., at a height where a tip 230 of temperature sensor 204 is positioned at a desirable depth within fluid 184 for precise temperature monitoring. Similarly, second end 212 may be placed on exterior surface 224 of cooking utensil 180 such that it is secured by magnetic force. In some embodiments, a top 209 of temperature sensor 204 is provided between the fluid 184 and a top of cooking utensil 180.

In cases where cooking utensil 180 is not ferromagnetic, flexible arm 202 may still be secured to cooking utensil 180 by positioning first end 210 and second end 212 of flexible arm 202 near interior surface 222 and exterior surface 224, respectively, such that the magnetic force between first magnet 226 and second magnet 228 draw first end 210 and second end 212 toward each other and generate a clamping force on side 220 of cooking utensil 180. In this regard, first magnet 226 and second magnet 228 should be positioned within first end 210 and second end 212, respectively, such that their opposing polarities generate an attractive force when placed on either side of the cooking utensil 180 (i.e., the orientation shown in FIG. 3).

Temperature sensor 204 may extend from first end 210 of flexible arm 202 and may be configured for measuring the temperature of fluid 184 in cooking utensil 180. In this regard, tip 230 of temperature sensor 204 may be placed in fluid 184 as desired to determine the temperature of fluid 184, and therefore the temperature of food products 182. Specifically, temperature sensor 204 may be mounted to flexible arm 202 such that it is in thermal contact with food products 182 in cooking utensil 180 in order to measure the temperature of food products 182. Additionally or alternatively, the top 209 of temperature sensor 204 may be in thermal contact with the air above fluid 184 in order to measure the temperature of the air.

Temperature sensor 204 may generally include a housing 240 and an insertion probe 244 that extends out of a bottom of housing 240 toward tip 230 at a distal end of insertion probe 244. Control electronics may be positioned at any suitable location within temperature sensor 204 for insulating sensitive electronics from unsuitably high heat. For example, according to the exemplary embodiment, the control electronics are positioned within insertion probe 244, where the food products 182 and/or fluid 184 helps keep these components cool.

In general, temperature sensor 204, or more particularly, insertion probe 244, may include a thermocouple, a thermistor, or any other device suitable for measuring the temperature of food products 182 or fluid 184 within cooking utensil 180. According to exemplary embodiments, temperature sensor 204 may be positioned entirely within the cooking utensil 180 when the temperature probe 200 is installed. In this regard, insertion probe 244 and housing 240 may be mounted to flexible arm 202 such they are both positioned entirely below a top of cooking utensil 180. In this manner, temperature sensor is protected from direct radiant energy or flame from the heating element 150, a lid may be more easily placed on top of cooking utensil 180, etc.

In order to perform a precise cooking operation and ensure food products are cooked thoroughly and appropriately, each of a temperature of the fluid inside the cooking utensil and a temperature of the air above the fluid must be carefully monitored. Specifically, the temperature of the fluid should be maintained within an acceptable zone. The presence of a cover over the cooking utensil may greatly affect the temperatures of both the fluid and the air, and thus the presence of the cover should be monitored. Measuring both the fluid temperature and the air temperature may provide an accurate determination of the presence of a lid, and therefore determine the correct level of controller gains needed to provide an appropriate power level at the heating element to perform an accurate cooking operation. In particular, predicting and monitoring the temperature of the air above the fluid in addition to monitoring the temperature of the fluid results in a more accurate cooking operation.

Temperature sensor 204 may include a first temperature sensor 206 and a second temperature sensor 208. First temperature sensor 206 may be a fluid temperature sensor. For example, first temperature sensor 206 may be located at or near tip 230 of insertion probe 244. First temperature sensor 206 may be located at any suitable portion of insertion probe 244 such that first temperature sensor 206 is submerged within fluid 184 during operation. Accordingly, first temperature sensor 206 may be configured to sense a temperature of fluid 184. Second temperature sensor 208 may be an air temperature sensor. Second temperature sensor 208 may be located at or near a top 209 of control housing 240. For instance, second temperature sensor 208 may be arranged so as not to be submerged within liquid 184. Accordingly, second temperature sensor 208 may be configured to sense a temperature of the air above fluid 184 within cooking utensil 180.

A wireless communication module 250 may also be included to communicate temperature information as described herein. For example, wireless communication module 250 may communicate temperature measurements to controller 166 of cooking appliance 100, to display 164, to a user's mobile device, or to any other display or controller. More specifically, for example, controller 166 may be in operative communication with wireless communication module 250 to facilitate communications between temperature sensor 204 (e.g., first temperature sensor 206 and second temperature sensor 208) and various other components of cooking appliance 100. For instance, wireless communication module 250 may serve as an interface to permit insertion probe 244 to transmit and/or receive signals associated with the temperature of food products 182 and/or liquids 184. Communications between temperature probe 200 and the cooking appliance 100 may be achieved using any suitable wireless communication protocol, for example, WiFi, ZigBee, Bluetooth, and others.

During operation, controller 166 may receive the measured temperature data from wireless communication module 250 and selectively energize heating elements 150 to maintain a desired temperature of food products 182 or liquids 184 responsive to the measured temperature from temperature probe 200. In this manner, controller 166 may receive instantaneous feedback regarding the actual temperature of food products 182 within cooking utensil 180, resulting in closed loop feedback that may optimize control of heating elements 150. Controller 166 may then adjust heating elements 150 to ensure the temperature is precisely controlled to match the desired cooking temperature or a specific cooking temperature profile. For example, as shown in FIG. 5, an adjustment mechanism 262 (described below) determines an adjusted level of controller gains to alter an output of heating elements 150.

Figure 5:
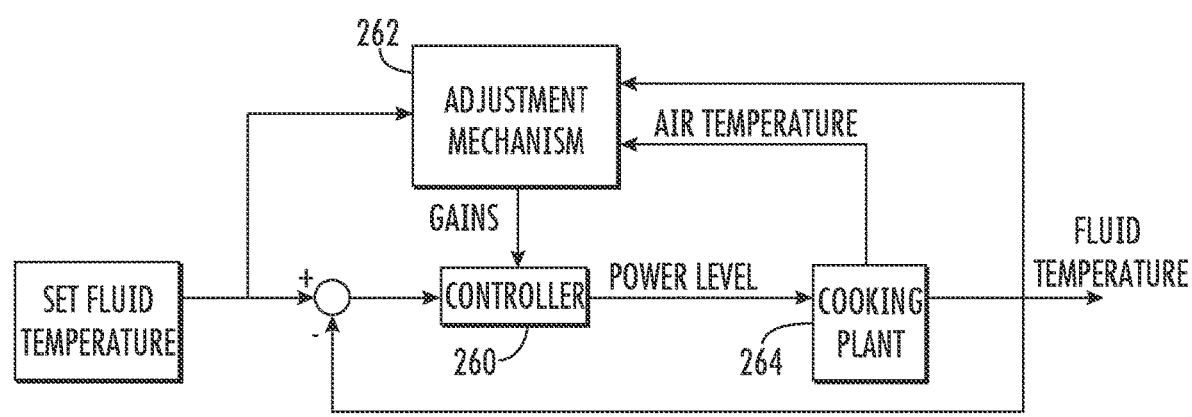
FIG. 5 provides a schematic representation of a cooking cycle according to an exemplary embodiment of the present subject matter.

FIG. 5 provides a schematic representation of an exemplary cooking cycle. In detail, a cooking cycle may be incorporated as a closed loop cooking controller 260 operating as a feedback loop utilizing an actual fluid temperature (which will be described in detail below). Cooking controller 260 may also be or include the capabilities of either a proportional (P), proportional-integral (PI), or proportional-integral-derivative (PID) control for feedback-based control implemented with, e.g., temperature feedback from one or more sensors. Cooking controller 260 may send signals relating to the power level to a cooking plant (e.g., including a heating element) 264. In order to determine the proper power level, the cooking controller 260 receives a set of controller gains ($K_p$, $K_i$, $K_d$, described below) from an adjustment mechanism 262, for example. In some embodiments, the adjustment mechanism 262 may incorporate an algorithm that determines a "covered" or "uncovered" state of the cooking utensil (described in detail below). The adjustment mechanism 262 may calculate a set of gains required to properly operate the heating element in order to maintain the fluid temperature at the set temperature. Therefore, the power level of the heating element may be determined according to the controller gains required by the cooking controller 260, the controller gains being determined by the adjustment mechanism 262. It should be appreciated that the appropriate controller gains determined by the adjustment mechanism 262 relate to the power level required by the heating element. Further, it should be appreciated that the exemplary cooking cycle described herein may be modified to accommodate specific operations, as would be obvious to one having ordinary skill in the art.

The PID control algorithm may be a feedback-based control algorithm that continuously calculates an error value (e.g., a difference between the set fluid temperature and the actual fluid temperature, for example, within controller 260) and applies a control output (e.g., power level) based on proportional, integral, and derivative terms to minimize the error value (e.g., to drive the fluid temperature to the set temperature). According to an exemplary embodiment, the control output is used to continuously control a power level of the heating element.

When using the PID control algorithm, the control output (e.g., power level) may be a weighted sum of the proportional, integral, and derivative terms. In general, the proportional term may account for present error values, the integral term may account for past error values, and the derivative term may account for possible future error values. Notably, the integral term may accumulate over time and may be used to generate a larger control output as the integral error value accumulates. An exemplary PID control algorithm is shown in the following equation, wherein $K_p$, $K_i$, and $K_d$ are the proportional, integral, and derivative controller gains, respectively, and u(t) is the controller output:

$$u(t)=K_p e(t)+K_i \int e(t)dt+K_d (de(t)/dt)$$

Notably, the input to the PID control algorithm may be the error value. As explained above, when the proportional, integral, and derivative controller gains are fixed, the PID control algorithm is typically better for either rapidly responding to large error values or providing improved stability when the error value is small (i.e., when the actual fluid temperature is close to the set fluid temperature). More specifically, large controller gains may provide rapid response to large temperature excursions (i.e., larger error values), but may result in poor stability when the error value is small. By contrast, small controller gains may be ideal for fine-tuning the fluid temperature when the actual fluid temperature is close to the set fluid temperature but provide a very slow response to larger error values.

Figure 6:
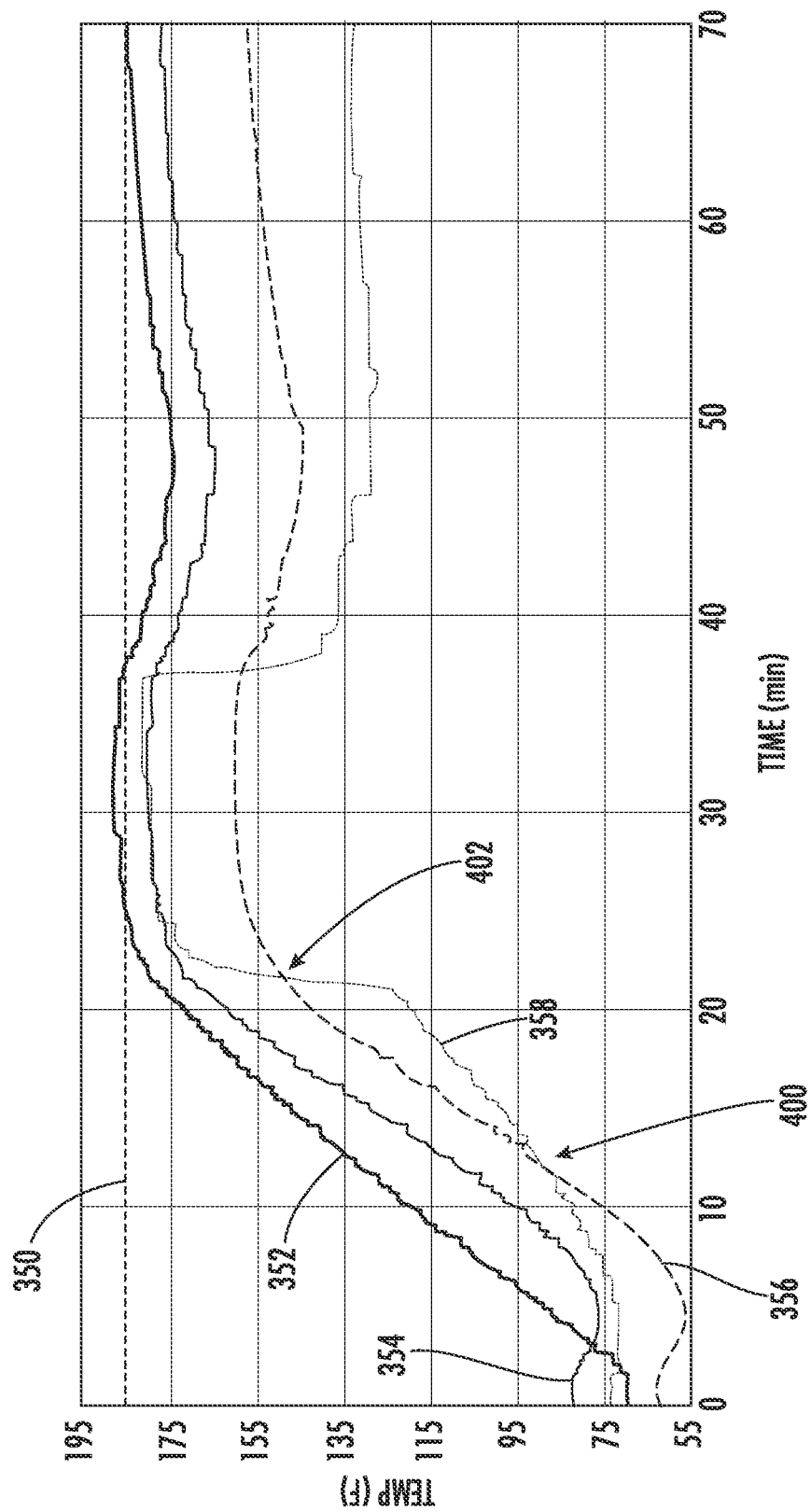
FIG. 6 provides a graph illustrating various temperatures measured or predicted within or around a cooking utensil during a cooking operation according to an exemplary embodiment of the present subject matter.

FIG. 6 provides a graph illustrating temperature versus time for a cooking operation. A set temperature 350 may be set by a user. The set temperature 350 may be set according to a desired doneness of the food product. The actual fluid temperature 352 may increase during a preheat stage and approach the set temperature 350. The predicted air temperature 354 may thus be calculated over the course of the cooking operation while the heating element is operated at an initial (or first) set of controller gains. For example, as the predicted air temperature 354 is calculated, the adjustment mechanism 262 assumes that cooking utensil 180 is in the "covered" state. As described above, the air temperature threshold 356 may then be calculated as a fixed amount lower than the predicted air temperature 354. The actual air temperature 358 may also be measured and compared to the predicted air temperature 354. As shown in FIG. 6, the actual air temperature 358 may fall below the air temperature threshold 356 during the cooking operation. At this point, the adjustment mechanism 262 may determine that the cooking utensil is in the "uncovered" state. An adjusted set of controller gains may be sent to the controller (e.g., cooking controller 260). Accordingly, the heating element may receive a new input from the cooking cycle (e.g., cooking controller 260). Subsequently, the actual air temperature 358 may increase to be greater than the air temperature threshold 356. Accordingly, the adjustment mechanism 262 may determine that the cooking utensil is in the "covered" state and provide the first set of controller gains to the controller 260. As the actual air temperature fluctuates above and below the air temperature threshold, the adjustment mechanism 262 may continually determine the "covered" or "uncovered" state of the cooking utensil and change the controller gains accordingly. Advantageously, an error between the actual fluid temperature and the set temperature may be kept to a minimum, and a more accurate cooking operation may be performed.

Figure 7:
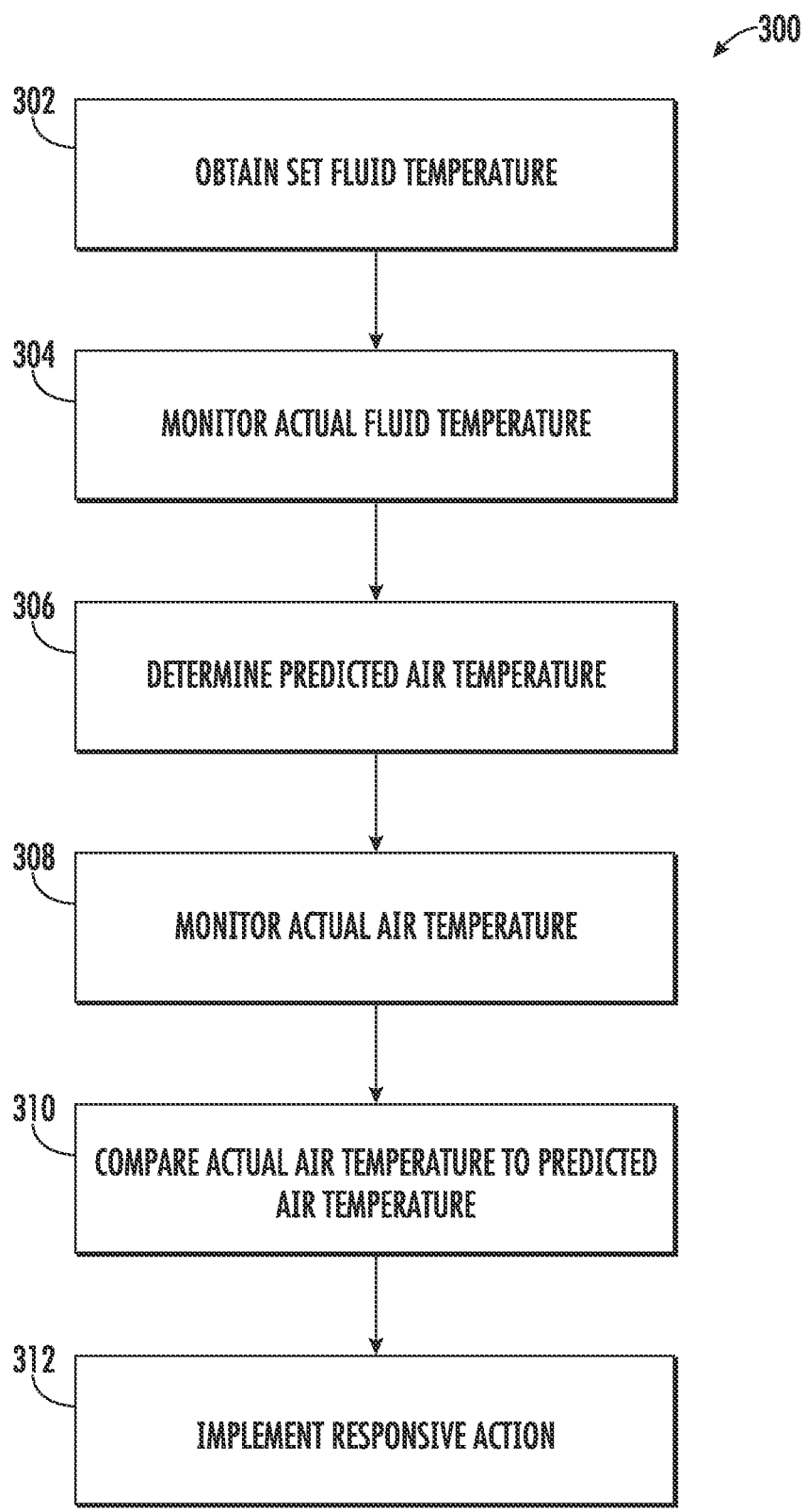
FIG. 7 provides a flow chart illustrating a method of operating a cooking appliance according to an exemplary embodiment of the present subject matter.

Referring now to FIG. 7, a method 300 of operating an exemplary cooking appliance (e.g., cooking appliance 100) will be described. It should be understood that method 300 may be applied to any suitable cooking appliance including a heating element and a temperature probe. At step 302, method 300 may include obtaining a set fluid temperature. The set fluid temperature may pertain to a fluid (e.g., fluid 184) contained within a cooking utensil (e.g., cooking utensil 180). The cooking utensil maybe a pot or pan, for example, that is heated by the heating element. The set fluid temperature may be commensurate with a desired cooking temperature of a food product (e.g., food product 182) submerged within the fluid.

For example, referring briefly to FIG. 6, the set temperature is identified generally by reference numeral 350. Although set temperature 350 is illustrated as being a constant temperature to facilitate description of aspects of the present subject matter, it should be appreciated that set temperature 350 may be time-varying, e.g., based on a desired cooking cycle or recipe. In addition, it should be appreciated that set temperature 350 may be determined in any suitable manner, e.g., by controller 166, based on a selected recipe, etc. In addition, the set temperature 350 may be selected by a user. For example, the user may enter in the set fluid temperature to a user interface (e.g., user interface panel 160). In some embodiments, the user enters a set temperature via wireless communication. Accordingly, an adjustment mechanism (e.g., adjustment mechanism 262) may then operate the controller 260 at the first set of controller gains corresponding to the "covered" state of the cooking utensil.

At step 304, method 300 may include monitoring an actual fluid temperature. A temperature probe (e.g., temperature probe 200) may be used to monitor an actual fluid temperature (e.g., as identified in FIG. 6 by reference numeral 352) of the fluid within the cooking utensil. For instance, the temperature probe may include a first temperature sensor for monitoring the temperature of the fluid and a second temperature sensor for monitoring a temperature of the air above the fluid within the cooking utensil. The first temperature sensor may be submerged within the fluid. The first temperature sensor may routinely sense the temperature of the fluid and send information regarding the temperature of the fluid to the adjustment mechanism. For example, the first temperature sensor senses the temperature of the fluid according to a predetermined schedule (e.g., every 30 seconds, every 15 seconds, every 5 seconds, etc.).

At step 306, method 300 may include determining a predicted air temperature above the fluid (e.g., as identified in FIG. 6 by reference numeral 354). For instance, the adjustment mechanism (e.g., adjustment mechanism 262) may predict the temperature of the air within the cooking utensil (i.e., bound by a side wall or walls of the cooking utensil) and above the fluid within the cooking utensil. The adjustment mechanism may institute a system model, or mathematical model, for determining the predicted air temperature. The system model may incorporate each of the set fluid temperature and the actual fluid temperature as measured by the first temperature sensor. The set fluid temperature and the actual fluid temperature are then incorporated as independent variables in the system model. In some embodiments, a regression analysis is used to determine the system model to be used in conjunction with the set fluid temperature and the actual fluid temperature to determine the predicted air temperature. The system model may be a transfer function, a regression equation, polynomial, etc., outputting a predicted air temperature at a given time from the set fluid temperature and the actual fluid temperature at the given time.

For instance, the adjustment mechanism may incorporate the set fluid temperature as a first independent variable into the system model. The adjustment mechanism may also continually (e.g., routinely) receive actual fluid temperature measurements from the first temperature sensor and incorporate the measurements as a second independent variable into the system model. The system model may be continually run to then determine the predicted air temperature within the cooking utensil above the fluid at a given time. In some embodiments, the predicted air temperature may be calculated under an assumption that the cooking utensil is in a "covered" state (i.e., a cover is in place on the cooking utensil). Accordingly, in determining the predicted air temperature, the adjustment mechanism operates the controller at the first set of controller gains. The first set of controller gains may thus be associated with the "covered" state of the cooking utensil. Additionally or alternatively, the controller gains may be adjusted as needed according to the comparison of the predicted air temperature to the actual air temperature. As such, the power level of the heating element may be adjusted accordingly. For example, the cooking element may have a variety of power levels (e.g., percentage ON time, applied voltage, etc.).

At step 308, method 300 may include monitoring an actual air temperature above the fluid (e.g., as identified in FIG. 6 by reference numeral 358). For instance, the second temperature sensor of the temperature probe may be positioned above the fluid within the cooking utensil, and below a top rim of the cooking utensil. Accordingly, the second temperature sensor may continually (e.g., routinely) sense the actual temperature of the air within the cooking utensil above the fluid. For example, the second temperature sensor senses the temperature of the air according to a predetermined schedule (e.g., every 30 seconds, every 15 seconds, every 5 seconds, etc.). The second temperature sensor may then send the sensed temperature (e.g., via wire or wirelessly) to the adjustment mechanism. The adjustment mechanism may store the sensed (monitored) actual air temperature for analysis. For example, the actual air temperature is compared to the predicted air temperature, as described below.

At step 310, method 300 may include comparing the actual air temperature to the predicted air temperature. For instance, as a cooking operation progresses, the adjustment mechanism may continually compare the actual (e.g., measured or sensed) air temperature to the predicted air temperature. Additionally or alternatively, the adjustment mechanism may determine an air temperature threshold (e.g., as identified in FIG. 6 by reference numeral 356) in relation to the predicted air temperature. The air temperature threshold may be a predetermined amount less than the predicted air temperature during the cooking process. The air temperature threshold may be about 45 degrees less than the predicted air temperature, may be about 30 degrees less than the predicted air temperature, may be about 15 degrees less than the predicted air temperature, etc. Accordingly, the actual air temperature may be compared to the predicted air temperature in view of the predetermined air temperature threshold.

At step 312, method 300 may include implementing a responsive action based on the comparison between the actual air temperature and the predicted air temperature. For instance, the adjustment mechanism may determine a delta (e.g., difference) between the predicted air temperature and the actual air temperature (e.g., between 354 and 358 in FIG. 6). In some embodiments, the adjustment mechanism determines that the actual air temperature is different from the predicted air temperature by an amount greater than the air temperature threshold. In other words, a difference between the actual air temperature and the predicted air temperature may be greater than an offset amount between the predicted air temperature and the air temperature threshold. In this case, the adjustment mechanism may determine that the cooking utensil is in the "uncovered" state (e.g., no cover is present on the cooking utensil). Referring briefly to FIG. 6, for example, the adjustment mechanism may determine that the cooking utensil is in the "uncovered" state at point 400 (when the actual air temperature drops below the air temperature threshold).

When the adjustment mechanism determines that the cooking utensil is in the "uncovered" state (when the actual air temperature is less than the predicted air temperature by more than the predetermined amount), the adjustment mechanism may adjust at least one operating parameter of the cooking appliance. In detail, upon determining the "uncovered" state of the cooking utensil, the adjustment mechanism may determine that additional power needs to be supplied to the heating element providing heat to the cooking utensil. For example, the adjustment mechanism determines that additional controller gains are required in the cooking system. In turn, the additional controller gains may result in an increased power level at the heating element. Accordingly, the one or more operating parameters of the cooking appliance may include a power level of the heating element, a level of controller gains supplied to the controller, or the like.

In some embodiments, the operating parameters include a first set of controller gains and a second set of controller gains. As discussed above, the first set of controller gains may be associated with a presumed "covered" status of the cooking utensil. In detail, when a user initiates a cooking operation, the adjustment mechanism may supply the first set of controller gains to the controller to heat the fluid within the cooking utensil to the set fluid temperature. The adjustment mechanism may thus assume that the cooking utensil is in the "covered" state or status. Upon determining that the actual air temperature is below the air temperature threshold, the adjustment mechanism may determine that the cooking utensil is in the "uncovered" state. Accordingly, the adjustment mechanism may supply the second set of controller gains to the controller. For example, the cooking cycle may determine that adjusted controller gains are required to adjust the power level of the heating element. In some embodiments, the second set of controller gains may be associated with the "uncovered" status of the cooking utensil. It should be understood that varying power levels may be associated with varying sets of controller gains, as required in certain applications. The adjustment mechanism may continue to monitor the difference between the actual air temperature and the predicted air temperature. Referring briefly again to FIG. 6, for example, the adjustment mechanism may determine that the cooking utensil is again in the "covered" state at point 402 (when the actual air temperature is above the air temperature threshold). Accordingly, the adjustment mechanism may supply the first set of controller gains to the controller.

When the actual air temperature is below the air temperature threshold, the difference (delta) between the actual fluid temperature and the actual air temperature may be larger than desired. Thus, the actual fluid temperature may be more susceptible to heat dissipation, which in turn degrades a cooking efficiency and performance. Accordingly, the second set of controller gains may be greater than the first set of controller gains. Advantageously, when a larger set of controller gains is provided to the cooking cycle, the heating element may be directed at higher power levels, resulting in increased power to the heating element and increased ability to maintain the actual fluid temperature at or near the set fluid temperature.

In some embodiments, when the adjustment mechanism determines that the cooking utensil is in the "uncovered" state (e.g., that the actual air temperature is below the air temperature threshold), the controller may provide a user notification. In detail, the controller may emit an alert notifying the user that the cooking utensil is not covered and suggest that the cover be placed on the cooking utensil. The alert may be emitted directly from the cooking appliance (e.g., user interface panel 160). In some embodiments, the alert is sent to the user directly (e.g., wirelessly to a mobile device). The alert may include a noise alert such as a buzz or chime, for example, a text alert on the mobile device or display (e.g., display 164), or a light alert on the mobile device or user interface panel. Accordingly, the user may be notified that the cooking utensil is in the "uncovered" state.

Additionally or alternatively, the responsive action may include incorporating a determined delay between comparing the actual air temperature to the predicted air temperature and implementing the responsive action. For instance, the adjustment mechanism may initiate a timer sequence upon performing an initial comparison between the actual air temperature and the predicted air temperature. The timer sequence may run for a predetermined length of time. The timer sequence may run for about 30 seconds, about one minute, about 2 minutes, for example. While the timer sequence is running, the adjustment mechanism may continue to compare the actual air temperature to the predicted air temperature. If the difference between the actual air temperature and the predicted air temperature returns to an acceptable amount (i.e., if the actual air temperature is greater than the air temperature threshold after the predetermined length of time), the responsive action may not be implemented. In this case, the adjustment mechanism may not adjust the gains supplied to the controller. In other words, the adjustment mechanism may maintain the controller at the first set of controller gains (e.g., associated with the "covered" state of the cooking utensil). This delay may account for a user temporarily uncovering the cooking utensil to add food or check a cooking progress before replacing the cover.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking appliance, the cooking appliance comprising a probe having a first temperature sensor and a second temperature sensor, the method comprising:
   obtaining a set fluid temperature for a fluid within a cooking utensil;
   monitoring an actual fluid temperature via the first temperature sensor of the probe;
   determining a predicted air temperature above the fluid;
   monitoring an actual air temperature above the fluid via the second temperature sensor of the probe;
   comparing the actual air temperature to the predicted air temperature;
   determining a cover state of the cooking utensil based on the comparison of the actual air temperature and the predicted air temperature; and
   implementing a responsive action based on the comparison between the actual air temperature and the predicted air temperature, wherein the responsive action comprises adjusting at least one controller gain of a set of controller gains according to the determined cover state of the cooking utensil.

2. The method of claim 1, wherein the predicted air temperature is determined via a regression analysis model based on the set fluid temperature and the actual fluid temperature.

3. The method of claim 1, wherein implementing the responsive action further comprises adjusting at least one operating parameter of the cooking appliance.

4. The method of claim 3, wherein the cooking appliance further comprises a proportional-integral-derivative (PID) controller configured to control a heating element within the cooking appliance.

5. The method of claim 3, wherein determining the cover state of the cooking utensil comprises:
   establishing an air temperature threshold; and
   determining that the actual air temperature is above the air temperature threshold, and wherein adjusting the set of controller gains comprises applying a first set of controller gains to the PID controller.

6. The method of claim 5, wherein the air temperature threshold is a predetermined amount less than the predicted air temperature as a function of time.

7. The method of claim 6, wherein determining the cover state of the cooking utensil comprises:
- determining that the actual air temperature is below the air temperature threshold, and wherein adjusting the set of controller gains comprises applying a second set of controller gains to the PID controller.

8. The method of claim 6, further comprising:
- determining that the actual air temperature is below the air temperature threshold; and
- providing a user notification via an alert.

9. The method of claim 1, wherein implementing the responsive action further comprises incorporating a predetermined time delay between comparing the actual air temperature to the predicted air temperature and implementing the responsive action.

* * * * *